Aug. 10, 1965     McKINLEY B. LEATHEM     3,199,539
PROPORTIONING CONTROL VALVE FOR HYDRAULIC CYLINDERS
Filed July 12, 1963                     2 Sheets-Sheet 1

INVENTOR
McKinley B. Leathem

BY  *Cecil L. Wood*
ATTORNEY

Aug. 10, 1965   McKINLEY B. LEATHEM   3,199,539
PROPORTIONING CONTROL VALVE FOR HYDRAULIC CYLINDERS
Filed July 12, 1963   2 Sheets-Sheet 2

INVENTOR
McKinley B. Leathem

BY

ATTORNEY

United States Patent Office

3,199,539
Patented Aug. 10, 1965

3,199,539
PROPORTIONING CONTROL VALVE FOR
HYDRAULIC CYLINDERS
McKinley B. Leathem, 1909 Georgia St., Jeanerette, La.
Filed July 12, 1963, Ser. No. 294,576
3 Claims. (Cl. 137—625.24)

This invention relates to hydraulic control valves, and it has particular reference to a valve especially designed to control the movement of two or more pistons whereby to coordinate and equalize their movement regardless of any existing unequal loading conditions.

A primary object of the invention resides in the provision of a control valve for hydraulic fluids which is compactly designed and capable of automatically synchronizing the action of one or more pistons adapted for operation in unison and where it is desirable that the hydraulic force be equal and where counter-forces are unequal, as in leveling heavy machinery on uneven ground surfaces, or in operations connected with the forming of relatively large metal stampings, such as automobile bodies, tanks, and the like.

Another object of the invention is that of providing a control valve wherein is arranged numerous ports and passages through which the hydraulic fluid is caused to flow to maintain a constant balance with relation to the force required to actuate the respective pistons or rams so that such force is applied equally regardless of the unequal supporting surfaces or counter-forces present in a given type of operation, as when the ram is operated in a tilted position rather than in a level plane.

A still further object of the invention resides in the provision of a hydraulic control valve comprising, for its primary parts, a housing having a rotatable internal valve element capable of limited longitudinal movement, and having relatively narrow but elongated circumferential ports therein, whereby to allow maximum fluid flow with a minimum longitudinal movement of the valve element to control and synchronize the movement of hydraulic pistons although counterforces thereon are unequal, as in the operation of a large metal shear where the counterforces progress from one end of the shear to the other as the metal is cut.

It is another object of the invention to provide a valve of the character described which is operable with a minimum of force and is capable of readily reversing the flow of hydraulic fluid to return the pistons or rams to their inoperative positions in synchrony.

An object of the invention is that of providing a valve which is capable of automatically controlling the flow of hydraulic fluid acording to the pressures required in the respective cylinders so that the pistons or rams operating therein are moved in unison to impose the required amount of pressure without overloading any of the cylinders, and reversing the operation to return the fluid to the reservoir upon completion of the operating cycle.

Broadly, the invention contemplates the provision of an automatic valve whereby hydraulic pressures can be accurately and easily controlled to insure the synchronized equal advance of two or more hydraulic pistons or rams, affording compensation for any unequal loading conditions present, and without exerting excessive forces where such forces are not required, and affording means for reversing the fluid flow to return the actuated elements to their inoperative positions.

While the foregoing objects are paramount, other and lesser objects will become apparent as the description proceeds in connection with the appended drawings wherein.

Figure 1:
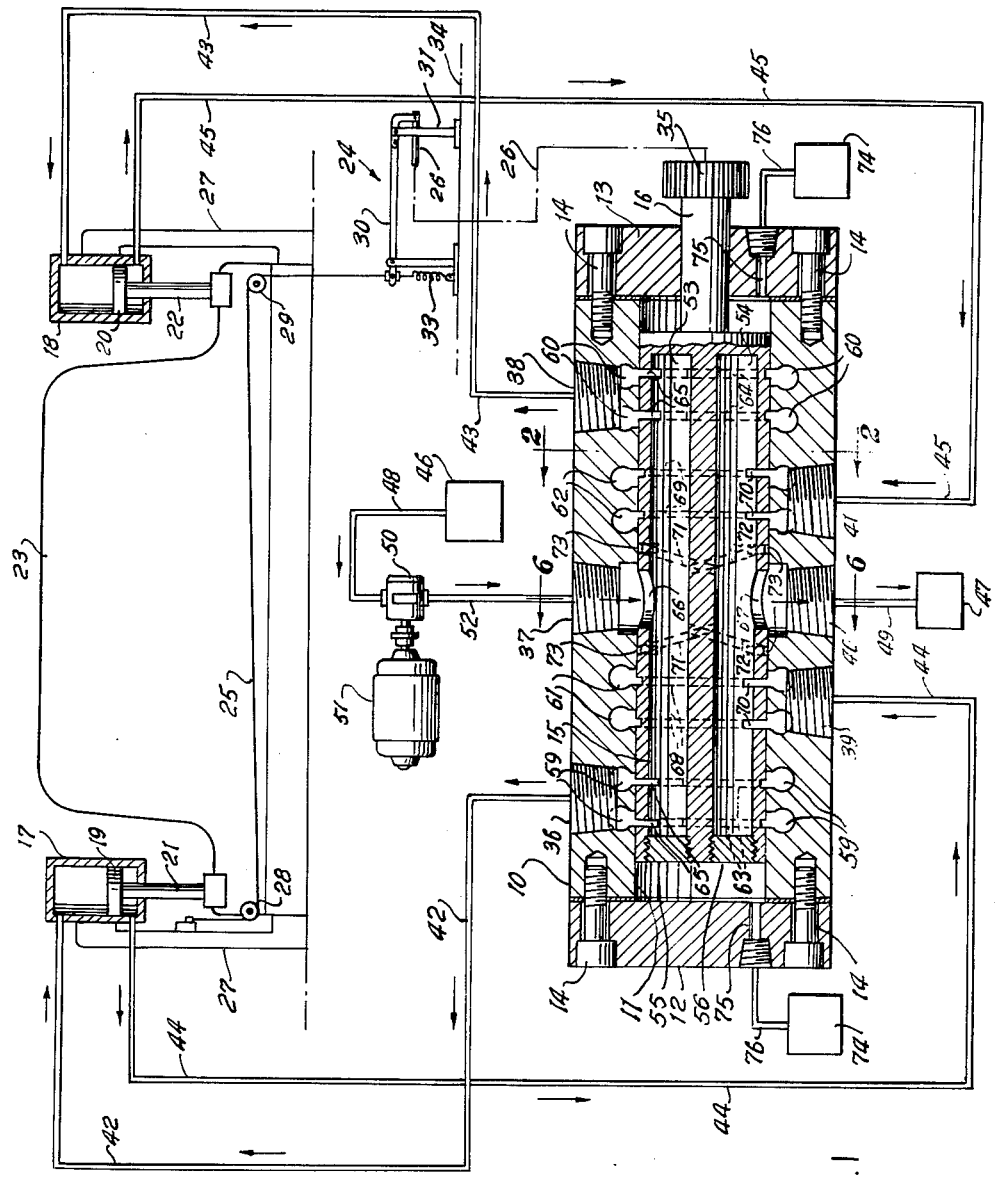
FIGURE 1 is a diagrammatic illustration of a hydraulic system in which the invention is installed, and showing the latter in longitudinal section whereby the several passages and ports in the rotative valve element and valve housing are open to advance the rams.
Figure 2:
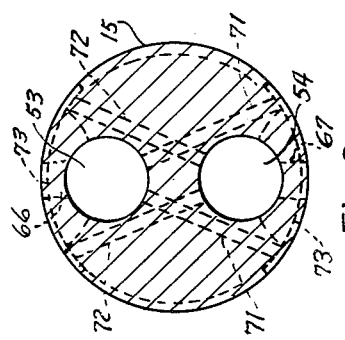
FIGURE 2 is a transverse sectional view through the rotative valve element on line 2—2 of FIGURE 1.

A valve structure embodying the invention is illustrated in longitudinal section in FIGURE 1, and comprises a housing 10 which may be cylindrical or rectangular in transverse section, and which has a cylindrical bore 11 axially thereof closed on each end by plates 12 and 13 secured by cap screws 14, or other suitable device.

Figure 3:
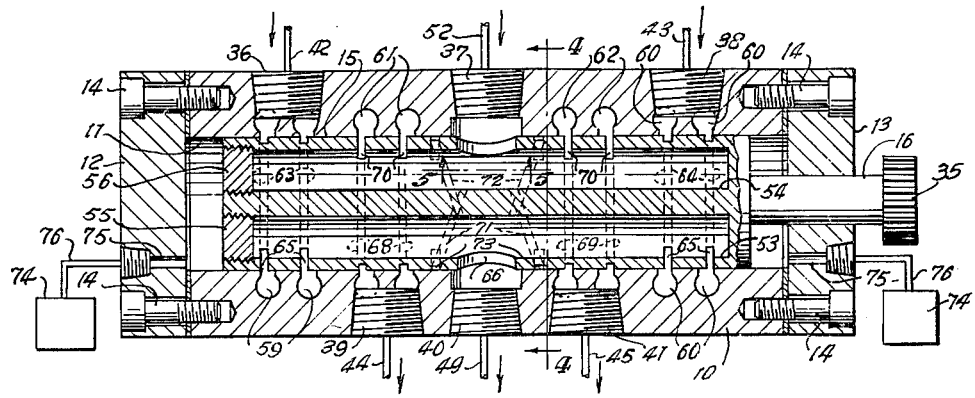
FIGURE 3 is a longitudinal sectional view showing the valve element in position to retract the rams.
Figure 4:
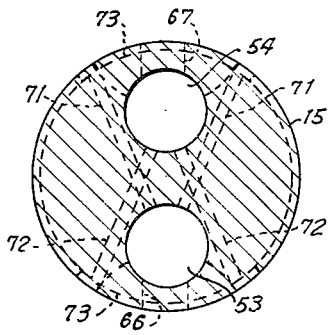
FIGURE 4 is a transverse sectional view of the valve element on line 4—4 of FIGURE 3.
Figure 5:
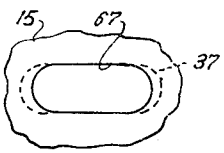
FIGURE 5 is a fragmentary view internally of the valve element, on line 5—5 of FIGURE 3, showing the ports on the inlet side of the valve.
Figure 6:
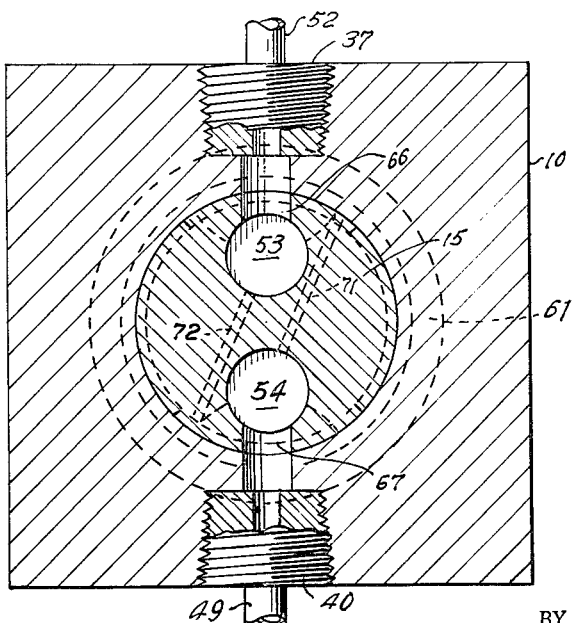
FIGURE 6 is a transverse sectional view of the valve housing and valve element, taken on line 6—6 of FIGURE 1.

A valve element 15 is rotatably arranged in the bore 11 and is capable of limited movement longitudinally thereof, as shown in FIGURES 1 and 3. A stem 16 is provided on one end of the valve element 15 and extends concentrically through the plate 13 providing means for rotating the valve element 15, and for endwise movement thereof as may be required for controlling the flow of hydraulic fluid through the valve.

*Conventional system schematically shown*

The invention is shown connected in a hydraulic system, which is schematically illustrated in FIGURE 1, and includes a pair of cylinders 17 and 18 having pistons 19 and 20 therein having plunger rods 21 and 22 connected at their outer ends to opposing sides of a controlled apparatus 23, such as a hydraulic press. The invention is designed to control hydraulic pressures in the system and insure a synchronized motion of the pistons 19 and 20 under varying conditions, as when the pressure load on one piston is greater than on the other.

Embodied in the system illustrated in FIGURE 1 is a sensing mechanism, generally indicated by the numeral 24, which is connected by a cable 25 to the controlled apparatus 23 and by any suitable device, indicated by the broken line 26, to the end of the stem 16 of the valve element 15. The cable 25 is secured at one end to the frame 27 of the controlled apparatus 23, which also supports the cylinders 17 and 18, and is passed over pulleys 28 and 29 at each end of the element 23, and having its opposite end secured to the outer end of an arm 30 which is pivoted, near its inner end, to a standard 31.

The arm 30 has a downwardly extending right-angular portion 32 at whose extremity is attached the actuating element 26. The outer end of the arm 30 is biased to a normal position by a pull spring 33, or other suitable device, whereby the endwise movement of the valve element 15 is controlled according to the particular requirement. The mechanism 24 may be arranged on any suitable base such as indicated by the broken line 34. The stem 16 of the valve element 15 is automatically rotated to its respective operative positions by a motor powered gear arrangement (not shown) connected to the gear 35 on the outer end of the stem 16.

The housing 10 is provided with fluid inlet and outlet ports 36, 37 and 38 on one side and 39, 40 and 41 on the opposite side. The ports 36 and 38 have connected thereto fluid lines 42 and 43 which communicate with the upper ends of the cylinders 17 and 18, and the ports 39 and 40 are connected to the lower ends of the cylinders 17 and 18 by fluid lines 44 and 45, respectively.

While only a single sump or reservoir is contemplated in the operation of the invention, for the purpose of illustration two such elements, indicated by the numerals 46 and 47 are shown diagrammatically in FIGURE 1 and each has a fluid line 48 or 49, respectively, connected thereto. The line 48 is connected to a pump 50, which is driven by a motor 51, and the pump is connected to the port 37 in the housing 10 by a line 52. The fluid line 49 is connected to the port 40 in the housing 10 opposite the port 37.

*The valve assembly*

The valve element 15, which is rotatably and slidably arranged in the bore 11 of the housing 10, has a pair of cylindrical chambers 53 and 54 formed longitudinally thereof, each being closed at their open ends by plugs 55 and 56 threaded thereinto, as shown in FIGURES 1 and 3. The chambers 53 and 64 have ports 66 and 67 therein, respectively, intermediate their ends which register with the ports 37 and 40 of the housing 10 in each of the rotative positions of the valve element 15, as shown in FIGURES 1 and 3, whereby hydraulic fluid is transmitted through the valve assembly by means of a plurality of ports and passages providing communication between the chambers 53 and 54, and which will be presently described.

Internally of the bore 11 through the housing 10 are formed a plurality of sets of grooves. Near each end of the bore 11 are sets of grooves 59 and 60, the former having communication with the port 36 in the housing 10, and the latter communicating with the port 38. Spaced from each side of the ports 37 and 40, intermediate the ends of the housing 10, are sets of grooves 61 and 62 which communicate with the ports 39 and 41 in the housing 10.

The valve element 15 has a plurality of sets of circumferential grooves formed thereon which are adapted to be aligned with the grooves 59, 60, 61 and 62 internally of the housing 10, and are shown in dotted lines in FIGURES 1 and 3. At each end of the valve element 15 are spaced grooves 63 and 64, each having a slotted port 65 thereon on one side of the valve element 15 open to the longitudinal chamber 53.

Spaced from each side of the ports 66 and 67, formed on each side of the valve element 15, and intermediate its ends, are grooves 68 and 69 which have slotted ports 70 communicating with the longitudinal chamber 54 of the valve element 15. The ports 66 and 67 in the valve element 15 are adapted to register alternately with the ports 37 and 40 in the housing 10, as will become apparent as the description proceeds.

Each of the longitudinal chambers 53 and 54 has communication with the peripheral surface of the valve element 15 through relatively small bores 71 and 72 which extend inwardly and incline toward the transverse axis of the element 15, as shown in dotted lines in FIGURES 1 and 3, on each side of the ports 66 and 67 therein. Each of the bores 71 and 72 open into a relatively shallow groove 73 formed partially around the surface of the element 15 at each of the bores 71 and 72, and extending from each side thereof, and whose purpose will presently become apparent.

*Operation*

The valve element 15 is shown in FIGURE 1 in its "power stroke" position by which hydraulic fluid is admitted to the cylinders 17 and 18 through fluid conduits 42 and 43 to force the pistons 19 and 20 downwardly. The fluid is circulated by the pump 50 from the reservoir 46–47 through the conduits 48 and 52 and into the chamber 53 through the ports 37 and 66. From the chamber 53 the fluid passes through the slotted ports 65 at each end and out through the ports 36 and 38 at each end of the housing 10, and through the conduits 42 and 43 to the cylinders 17 and 18. Meanwhile, the fluid pressure is equalized around the cylindrical valve element 15 by flowing through the circumferential grooves 63 and 64 therein which are in communication with the grooves 59 and 60 internally of the housing 10.

In order to equalize the pressure on both sides of the valve element 15, so that it may be moved longitudinally with a minimum of applied force, a portion of the fluid will flow from the chamber 53 through the bores 72 to the grooves 73, at the bottom of the element 15 in FIGURE 1, which have a total square inch area equal to that of the port 37. Limited longitudinal movement of the valve element 15 affords means for varying the flow areas through the ports 65 and 70 and controls the volume of fluid flow required to equalize the pressures in the cylinders 17 and 18.

The fluid is discharged from the opposite ends of the cylinders 17 and 18, behind the pistons 19 and 20, through the conduits 44 and 45, the ports 39 and 41, in the housing 10, the slotted ports 70 in the valve element 15, which open into the chamber 54, and out through the ports 67 and 40 to the reservoir 46–47. At the same time a portion of the fluid flows through the bores 71 from the chamber 44 to the grooves 73, at the top of the element 15 in FIGURE 1, and which have a total area equal to that of the port 40. The pressure on both sides of the element 15 will thus be equalized to enable the longitudinal movement thereof with a minimum of applied force. Meanwhile, fluid pressure around the element 15 is also equalized by its flow through the circumferential grooves 68 and 69 which communicate with the grooves 61 and 62 within the housing 10.

On the return stroke, or to return the pistons 19 and 20 to their inoperative positions, the valve element 15 is rotated 180 degrees to the position shown in FIGURE 3. In this position the port 67 is aligned with the intermediate port 37 so that the fluid, under pressure of the pump 50, flows through the conduit 52 and the ports 37 and 67 to the chamber 54 and out through the slotted ports 70 into the grooves 61 and 62 internally of the housing 10 around the element 15, thence out through the ports 39 and 41 and conduits 44 and 45 to the underside of the pistons 19 and 20, respectively.

Meanwhile, fluid is being forced out of the cylinders 17 and 18, as the pistons 19 and 20 are returned to their operative positions, through the conduits 42 and 43, the ports 36 and 38 in the housing 10, and the internal grooves 59 and 60 into the chamber 53 of the valve element 15 through the slotted ports 65, thence out through the ports 66 and 40 through the conduit 49 to the sump 46–47.

The cylindrical valve element 15 is adapted to be freely rotated within its chamber 11 in the housing 10 and pressure is equalized therearound through the relatively small passages 71 and 72 which form communications between the chambers 53 and 54 and the peripheral grooves 73 formed partially around the outer surface of the valve element 15. Negligible amounts of fluid may flow past the valve element 15 into the ends of the housing 10 and drained into sumps 74 through ports 75 in the plates 12 and 13 and conduits 76, as shown in FIGURES 1 and 3.

The invention is obviously capable of modification in structure and design without departing from the spirit and intent thereof or the scope of the appended claims.

What is claimed is:

1. In a control valve for equalizing pressures in a plurality of hydraulic cylinders, each having a piston therein adapted for unequal loading conditions, the said valve comprising, in combination, a housing having a plurality of fluid inlet and outlet ports therein, a cylindrical valve element rotatively arranged in said valve housing and capable of limited longitudinal movement in said housing, the said valve element having a pair of separate parallel chambers formed longitudinally thereof, each having a port intermediate its ends on opposing sides of said element, a plurality of sets of slotted ports formed in each of the chambers in said element and alternately registrable with said inlet and outlet ports of said housing when partially rotated therein, and capable of being partially closed upon limited longitudinal movement of said element, the said element having flow passages providing communication between each of said chambers and the outer surface of said element for equalizing pressure circumferentially thereof internally of said housing.

2. In a valve for controlling pressures in a plurality of hydraulic cylinders, the said valve comprising, in combination, a housing having a fluid inlet port on opposing sides intermediate its ends connected to a source, a plurality of fluid inlet and outlet ports on opposite sides of said inlet ports on both sides of said housing, a cylindrical valve element rotatively and slidably arranged in said housing and having a pair of separate parallel chambers formed longitudinally thereof, each having a port registrable with the inlet ports intermediate the ends of said housing, the said housing having a plurality of sets of internal grooves surrounding said valve element, and a plurality of sets of slotted ports in each of said chambers communicating with said grooves, the said slotted ports in said chambers being alternately registrable with said inlet and outlet ports in said housing when said valve element is rotated and capable of being partially closed when said valve element is moved longitudinally.

3. In a valve for controlling pressures in a plurality of hydraulic cylinders, the said valve comprising, in combination, a housing having a port on opposing sides intermediate its ends connected to a fluid source, and inlet and outlet ports providing communication with said cylinders, a valve element rotatively and slidably arranged in said housing and having a pair of separate parallel chambers formed longitudinally thereof, and a port in each chamber registrable with one of the ports intermediate the ends of said housing, a plurality of sets of slotted ports in each of said chambers alternately registrable with the inlet and outlet ports of said housing when said valve element is partially rotated, the said slotted ports being partially closed upon longitudinal movement of said valve element, and means providing for equalization of pressure circumferentially of said valve element in said housing.

References Cited by the Examiner

UNITED STATES PATENTS

| | | | |
|---|---|---|---|
| 2,391,492 | 12/45 | Turchan | 91—413 |
| 2,878,786 | 3/59 | Vuillemin | 91—413 |
| 3,036,558 | 5/62 | MacLeod | 91—180 |
| 3,040,716 | 6/62 | Hahn | 91—202 |

M. CARY NELSON, *Primary Examiner.*

FRED E. ENGELTHALER, *Examiner.*